United States Patent
Nguyen et al.

(10) Patent No.: US 12,106,443 B2
(45) Date of Patent: Oct. 1, 2024

(54) RESPONSIVE VIDEO CANVAS GENERATION

(71) Applicant: Adobe Inc., San Jose, CA (US)

(72) Inventors: Cuong D. Nguyen, San Francisco, CA (US); Valerie Lina Head, Pittsburgh, PA (US); Talin Chris Wadsworth, Alpine, UT (US); Stephen Joseph DiVerdi, Berkeley, CA (US); Paul John Asente, Redwood City, CA (US)

(73) Assignee: Adobe Inc., San Jose, CA (US)

( * ) Notice: Subject to any disclaimer, the term of this patent is extended or adjusted under 35 U.S.C. 154(b) by 240 days.

(21) Appl. No.: 17/678,516

(22) Filed: Feb. 23, 2022

(65) Prior Publication Data

US 2023/0267696 A1    Aug. 24, 2023

(51) Int. Cl.
  *G06T 19/20*   (2011.01)
  *G06T 15/20*   (2011.01)
  *G06T 17/20*   (2006.01)

(52) U.S. Cl.
  CPC .......... *G06T 19/20* (2013.01); *G06T 15/205* (2013.01); *G06T 17/20* (2013.01); *G06T 2219/2004* (2013.01); *G06T 2219/2016* (2013.01)

(58) Field of Classification Search
  CPC ....... G06T 15/205; G06T 17/20; G06T 19/20; G06T 2219/2004; G06T 2219/2016
  See application file for complete search history.

(56) References Cited

U.S. PATENT DOCUMENTS

| | | | |
|---|---|---|---|
| 5,943,064 A * | 8/1999 | Hong | G09G 5/397 345/519 |
| 11,238,657 B2 | 2/2022 | Nguyen et al. | |
| 2008/0080758 A1* | 4/2008 | Hoppe | A61B 6/583 382/132 |

(Continued)

OTHER PUBLICATIONS

"6 VR and Ar Statistics: Shaping the Future of Augmented Reality with Data", https://www.newgenapps.com/blog/6-vr-and-ar-statistics-shaping-the-future-of-augmented-reality-with-data, Jan. 1, 2018, 12 pages.

(Continued)

*Primary Examiner* — Kee M Tung
*Assistant Examiner* — Jed-Justin Imperial
(74) *Attorney, Agent, or Firm* — FIG. 1 Patents

(57) ABSTRACT

Techniques for responsive video canvas generation are described to impart three-dimensional effects based on scene geometry to two-dimensional digital objects in a two-dimensional design environment. A responsive video canvas, for instance, is generated from input data including a digital video and scene data. The scene data describes a three-dimensional representation of an environment and includes a plurality of planes. A visual transform is generated and associated with each plane to enable digital objects to interact with the underlying scene geometry. In the responsive video canvas, an edit positioning a two-dimensional digital object with respect to a particular plane of the responsive video canvas is received. A visual transform associated with the particular plane is applied to the digital object and is operable to align the digital object to the depth and orientation of the particular plane. Accordingly, the digital object includes visual features based on the three-dimensional representation.

20 Claims, 14 Drawing Sheets

(56) References Cited

U.S. PATENT DOCUMENTS

| | | | |
|---|---|---|---|
| 2009/0157478 | A1 | 6/2009 | Yang et al. |
| 2014/0285619 | A1* | 9/2014 | Acquavella ............. G06T 11/60 348/43 |
| 2018/0253858 | A1* | 9/2018 | Ni ............................ G06T 7/75 |
| 2019/0221024 | A1* | 7/2019 | Howson .................... G06T 1/60 |
| 2019/0362563 | A1* | 11/2019 | Mukherjee ............. G06F 3/011 |
| 2020/0197825 | A1 | 6/2020 | Bear et al. |
| 2021/0137634 | A1* | 5/2021 | Lang ...................... A61B 5/113 |

OTHER PUBLICATIONS

"Augmented Reality—The Past, The Present and the Future", Retrieved at: https://www.interaction-design.org/literature/article/augmented-reality-the-past-the-present-and-the-future, Aug. 27, 2019, 6 pages.
"Corrected Notice of Allowability", U.S. Appl. No. 16/806,612, filed Jan. 3, 2022, 2 pages.
"List of top Augmented Reality Companies—Crunchbase", Retrieved at: https://www.crunchbase.com/hub/augmented-reality-companies— on Oct. 14, 2019, 6 pages.
"Notice of Allowance", U.S. Appl. No. 16/806,612, filed Sep. 22, 2021, 8 pages.
"TikTok AR Filters", lenslist.co [retrieved Nov. 16, 2021]. Retrieved from the Internet <https://lenslist.co/tiktok-ar-filters/>., 3 Pages.
Alce, Gunter et al., "WozARd: A Wizard of Oz Method for Wearable Augmented Reality Interaction—A Pilot Study", Jun. 2015, 11 pages.
Arora, Rahul et al., "SymbiosisSketch: Combining 2D & 3D Sketching for Designing Detailed 3D Objects in Situ", Apr. 21, 2018, 15 pages.
Bae, et al., "EverybodyLovesSketch: 3D Sketching for a Broader Audience", Proceedings of the 22nd annual ACM symposium on User interface software and technology, Oct. 2009, 10 pages.
Bardram, Jakob et al., "Virtual Video Prototyping of Pervasive Healthcare Systems", Jan. 2002, 13 pages.
Beaudouin-Lafon, Michel et al., "Prototyping Tools and Techniques", Jan. 1, 2002, pp. 1006-1031.
Berry, Ayora , "Prototyping methods for augmented reality", Medium.com [online][retrieved Sep. 22, 2021]. Retrieved from the Internet <https://medium.com/@ayoraberry/prototyping-methods-for-augmented-reality-4b7687863423>., Sep. 30, 2019, 22 pages.
Carter, Adam S. et al., "How is User Interface Prototyping Really Done in Practice? A Survey of User Interface Designers", Sep. 2010, pp. 207-211.
Chen, Kevin et al., "Remote Paper Prototype Testing", Apr. 18, 2015, 4 pages.
Davis, Richard C. et al., "K-Sketch: A 'kinetic' sketch pad for novice animators", Apr. 10, 2008, 11 pages.
Dow, Steven et al., "Wizard of Oz Interfaces for Mixed Reality Applications", Apr. 2, 2005, 4 pages.
Fiala, Mark , "ARTag, a fiducial marker system using digital techniques", Jun. 20, 2005, 7 pages.
Flarup, Michael et al., "Designing for Augmented Reality", Retrieved at: https://www.youtube.com/watch?v=-r1VtYxvVlc, Jul. 24, 2018, 1 pages.
Green, Paul et al., "The Rapid Development of User Interfaces: Experience with the Wizard of Oz Method", Oct. 1985, 5 pages.
Guven, Sinem , "Authoring 3D Hypermedia for Wearable Augmented and Virtual Reality", Jan. 2003, 10 pages.
Guven, Sinem et al., "Mobile Augmented Reality Interaction Techniques for Authoring Situated Media On-Site", 2006 IEEE/ACM International Symposium on Mixed and Augmented Reality, Santa Barbard, CA [retrieved Feb. 11, 2021]., Retrieved from the Internet <https://www.researchgate.net/profile/Sinem_Guven/publication/221221371_Mobile_augmented_reality_interaction_techniques_for_authoring_situated_media_on-site/links/5668494508ae9da364b82922.pdf>., Oct. 2006, 3 pages.
Hall, Chris , "What is Google Maps AR navigation and Live View and how do you use it?", Pocket-lint [online][retrieved Dec. 15, 2021]. Retrieved from the Internet <https://www.pocket-lint.com/apps/news/google/147956-what-is-google-maps-ar-navigation-and-how-do-you-use-it>., May 10, 2021, 15 pages.
Hartmann, Bjorn et al., "Authoring Sensor-based Interactions by Demonstration with Direct Manipulation and Pattern Recognition", Aug. 29, 2007, 10 pages.
Henderson, Steven et al., "Exploring the Benefits of Augmented Reality Documentation for Maintenance and Repair", Oct. 2011, pp. 1355-1368.
Henderson, Steven J. et al., "Evaluating the Benefits of Augmented Reality for Task Localization in Maintenance of an Armored Personnel Carrier Turret", Oct. 19, 2009, pp. 135-144.
Jansson, David G. et al., "Design Fixation", Jan. 1991, 9 pages.
Kato, Hirokazu et al., "Marker Tracking and HMD Calibration for a Video-based Augmented Reality Conferencing System", In Proceedings. 2nd IEEE and ACM International Workshop on Augmented Reality, Oct. 20, 1999, 10 pages.
Kazi, Rubaiat H. et al., "Kitty: Sketching Dynamic and Interactive Illustrations", Oct. 5, 2014, pp. 395-405.
Kazi, Rubaiat H. et al., "Motion Amplifiers: Sketching Dynamic Illustrations Using the Principles of 2D Animation", May 7, 2016, 11 pages.
Kim, Han-Jong et al., "miniStudio: Designers' Tool for Prototyping Ubicomp Space with Interactive Miniature", May 2016, pp. 213-224.
Kim, Han-Jong , "SketchStudio: Experience Prototyping with 2.5-Dimensional Animated Design Scenarios", Jun. 9, 2018, pp. 831-843.
Kwan, Kin C. et al., "Mobi3DSketch: 3D Sketching in Mobile AR", May 2, 2019, 11 pages.
Landay, James A. et al., "Interactive Sketching for the Early Stages of User Interface Design", Jul. 22, 1994, 19 pages.
Ledo, David et al., "Astral: Prototyping Mobile and Smart Object Interactive Behaviours Using Familiar Applications", Jun. 2019, pp. 711-724.
Ledo, David et al., "Evaluation Strategies for HCI Toolkit Research", Apr. 21, 2018, 17 pages.
Leiva, German et al., "Enact: Reducing Designer-Developer Breakdowns when Prototyping Custom Interactions", Jul. 2019, 48 pages.
Leiva, German et al., "Montage: A Video Prototyping System to Reduce Re-Shooting and Increase Re-Usability", Dec. 28, 2018, 9 pages.
Li, Yuwei et al., "SweepCanvas: Sketch-based 3D Prototyping on an RGB-D Image", UIST '17: Proceedings of the 30th Annual ACM Symposium on User Interface Software and Technology [retrieved Feb. 12, 2021]., Retrieved from the Internet <https://www.researchgate.net/profile/Yuwei_Li10/publication/320574341_SweepCanvas_Sketch-based_3D_Prototyping_on_an_RGB-D_Image/links/59f843eea6fdcc075ec7e01e/SweepCanvas-Sketch-based-3D-Prototyping-on-an-RGB-D-Image.pdf>., Oct. 2017, pp. 387-399.
Luciani, Danwei T. et al., "Empowering Non-Designers Through Animation-based Sketching", Oct. 2017, 9 pages.
MacIntyre, Blair et al., "DART: A Toolkit for Rapid Design Exploration of Augmented Reality Experiences", Oct. 2004, 10 pages.
MacKay, Wendy A. , "Using Video to Support Interaction Design", Jan. 2002, 42 pages.
MacKay, Wendy E. , "Video Brainstorming and Prototyping: Techniques for Partifipatory Design", May 1999, 2 pages.
MacKay, Wendy E. , "Video Prototyping: a technique for developing hypermedia systems", Apr. 13, 1988, 3 pages.
Maudet, Molwenn et al., "Design Breakdowns: Designer-Developer Gaps in Representing and Interpreting Interactive Systems", Oct. 10, 2017, 13 pages.
Mohr, Peter et al., "Retargeting Video Tutorials Showing Tools With Surface Contact to Augmented Reality", May 2017, 13 pages.
Nebeling, Michael et al., "360proto: Making Interactive Virtual Reality & Augmented Reality Prototypes from Paper", Jul. 19, 2019, 13 pages.
Nebeling, Michael et al., "The Trouble with Augmented Reality/Virtual Reality Authoring Tools", Oct. 2018, 5 pages.
Nuernberger, Benjamin et al., "SnapToReality: Aligning Augmented Reality to the Real World", May 7, 2016, 12 pages.
Rettig, Marc , "Prototyping for Tiny Fingers", Apr. 1994, 10 pages.

(56) References Cited

OTHER PUBLICATIONS

Saquib, Nazmus et al., "Interactive Body-Driven Graphics for Augmented Video Performance", Feb. 2, 2019, 13 pages.
Seichter, Hartmut et al., "ComposAR: An Intuitive Tool for Authoring AR Applications", Sep. 2008, 3 pages.
Tognazzini, Bruce, "The "Starfire" Video Prototype Project: A Case History", Apr. 1994, 7 pages.
Mstisen, Peter et al., "Return of the Vision Video—Can corporate vision videos serve as setting for participation?", Jan. 2017, 10 pages.
Wellner, Pierre D., "Interacting with paper on the DigitalDesk", Mar. 1994, 107 pages.
Xia, Shihong et al., "A Survey on Human Performance Capture and Animation", May 2017, 19 pages.
Xiao, Robert et al., "WorldKit: Rapid and Easy Creation of Ad-hoc Interactive Applications on Everyday Surfaces", Apr. 2013, 10 pages.

\* cited by examiner

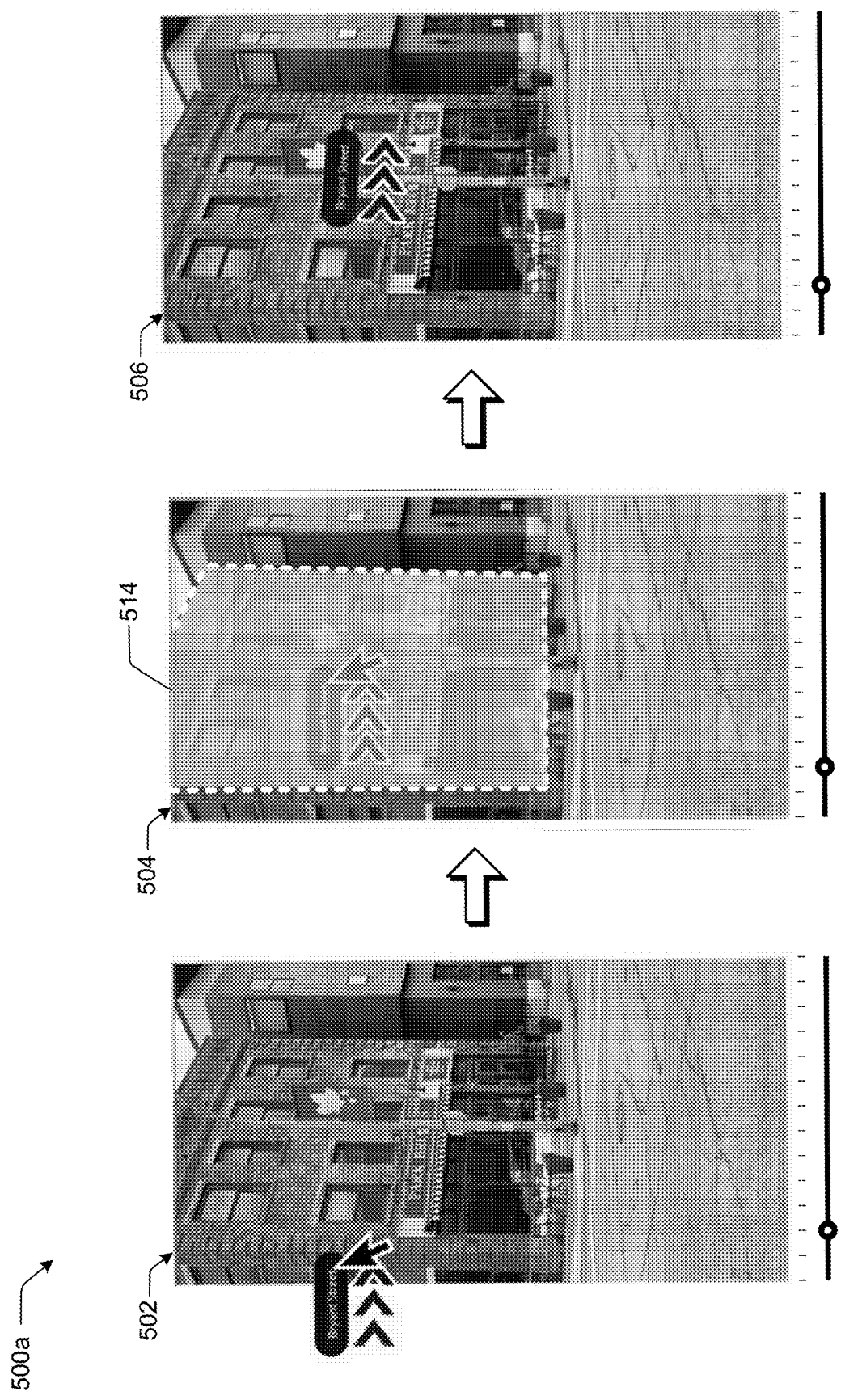

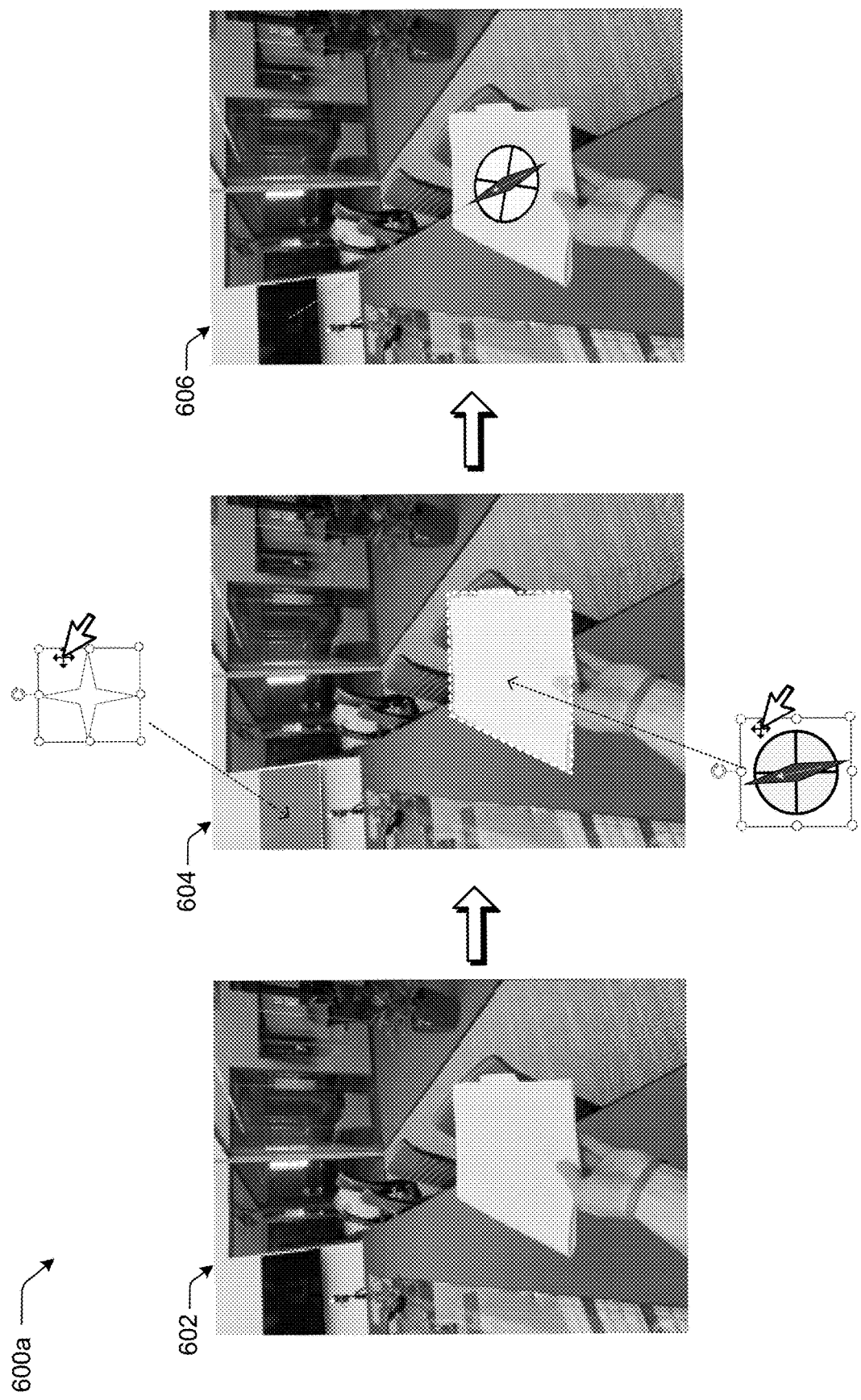

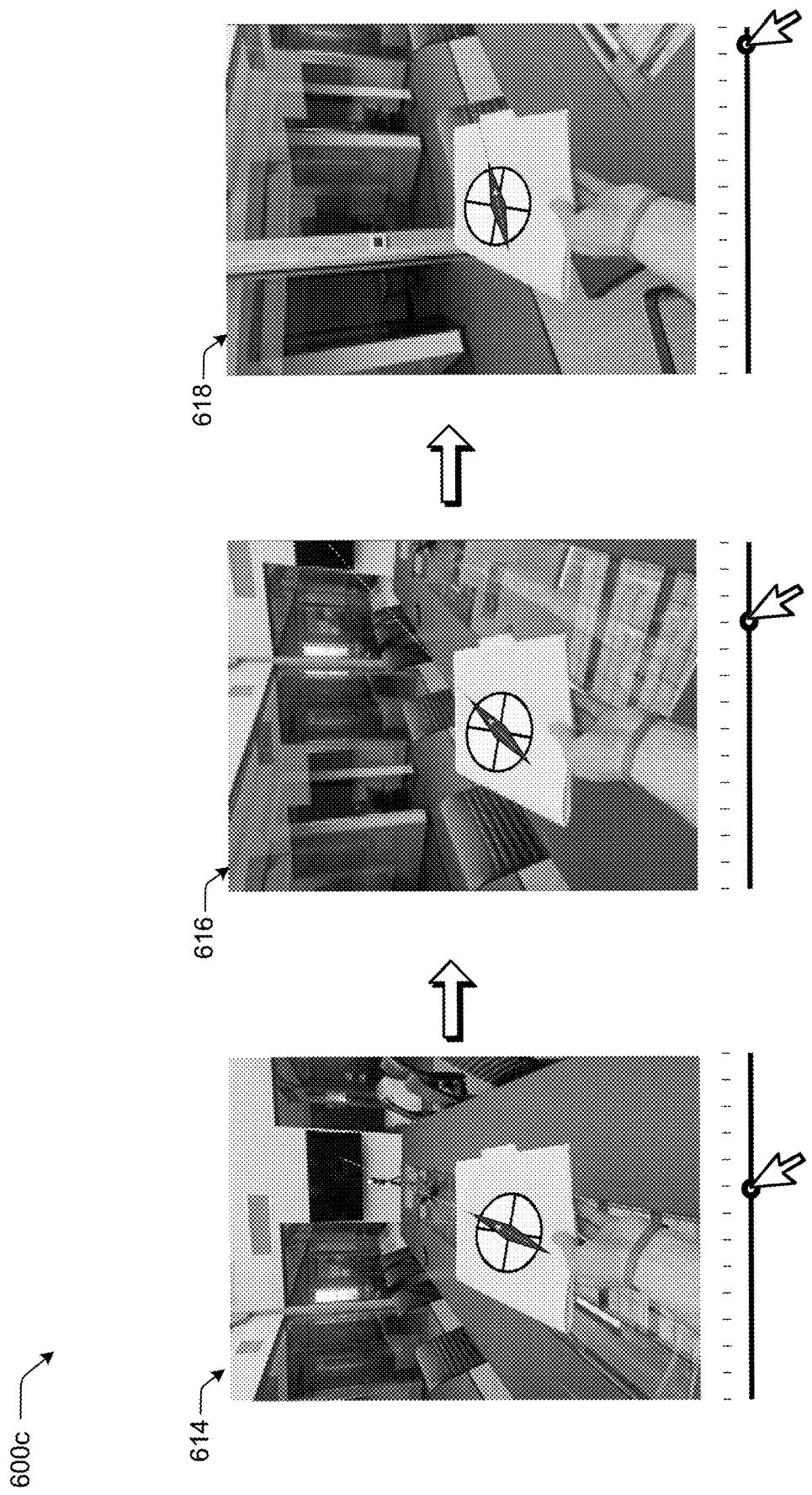

800

802
Determine a scaling matrix and a translation matrix to transform a vertex of the two-dimensional digital object in a local coordinate space of the two-dimensional design environment to a vertex in a different coordinate space associated with the three-dimensional representation

804
Calculate a transformation matrix to convert a projection matrix associated with the two-dimensional design environment to a projection matrix associated with the three-dimensional representation

806
Transform vertices of the two-dimensional digital object in a local coordinate space of the two-dimensional design environment to clip space coordinates in a clip space associated with the three-dimensional representation, the clip space defining a three-dimensional perspective

808
Applying a perspective divide transformation to convert a vertex of the two-dimensional digital object from the clip space coordinates to screen space coordinates

Fig. 8

RESPONSIVE VIDEO CANVAS GENERATION

BACKGROUND

Augmented reality (AR) and virtual reality (VR) applications include interactive interfaces and techniques used to supplement real-world or virtual environments with virtual content and objects. AR and VR applications have a wide range of usage scenarios and implementations, and with the development of and improvements to AR and VR-capable mobile devices, capturing augmented and virtual reality data is widely accessible. Accordingly, there is a high demand for development of AR and VR applications.

A significant aspect of the AR and VR application development process occurs in the pre-visualization stage as part of designing and prototyping an environment. In an example, the pre-visualization stage involves a number of designers, researchers, clients, and project managers communicating their design ideas about how an AR or VR application will look and function. From a prototyping standpoint, it is useful to create "mock-ups" to visualize these design ideas.

However, conventional three-dimensional user experience (UX) tools are based on complex interactions and require an extensive technical knowledge of advanced programming and three-dimensional modelling skills. Although conventional two-dimensional UX tools are easier to learn and are user friendly, these tools are limited to two-dimensional inputs and therefore lack the ability to process three-dimensional AR or VR interactions. Thus, digital objects included in these systems are static, and lack the ability to interact with an environment depicted in the AR or VR applications. Accordingly, conventional approaches used for prototyping either do not support three-dimensional workflow or require an in-depth knowledge of advanced programming and 3D modelling skills, which can be challenging, time consuming, limit collaborative opportunities, and hinder operation of computing devices that implement these conventional approaches.

SUMMARY

Techniques for generation of a responsive video canvas are described to support intuitive and rapid prototyping of three-dimensional effects in a two-dimensional design environment. In one example, input data is received including a digital video and scene data. The digital video includes a plurality of frames that depict an environment, and the scene data describes a three-dimensional representation of the environment. The underlying geometry of the environment, for instance, is defined using a plurality of planes to describe the environment. The responsive video canvas is generated by rendering at least one frame of the digital video for interaction in a two-dimensional design environment. Further, visual transforms are generated from the scene data and associated with each plane to enable two-dimensional digital objects to interact with the three-dimensional representation.

An edit positioning a two-dimensional digital object with respect to a particular plane of the responsive video canvas is received, and the respective visual transform associated with the particular plane is applied to the digital object. The visual transforms are operable to align the digital object, for instance to a depth and orientation of the particular plane. Thus, the visual appearance of the digital object is modified based on the underlying scene geometry. In this way, the techniques described herein overcome limitations of conventional techniques, which either are not compatible with a three-dimensional workflow or require an in-depth knowledge of advanced programming and 3D modelling skills.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. Entities represented in the figures are indicative of one or more entities and thus reference is made interchangeably to single or plural forms of the entities in the discussion.

FIGS. 5*a* and 5*b* depict an example of applying a visual transform to a digital object and updating the visual transform as the frame is updated.

FIGS. 6*a*, 6*b*, and 6*c* depict an example in which the visual appearance of a digital object is based in part on properties associated with a second digital object.

FIG. 8 is a flow diagram depicting a procedure in an example implementation of responsive video canvas generation including applying the visual transform to a digital object in greater detail.

DETAILED DESCRIPTION

Overview

Figure 1:
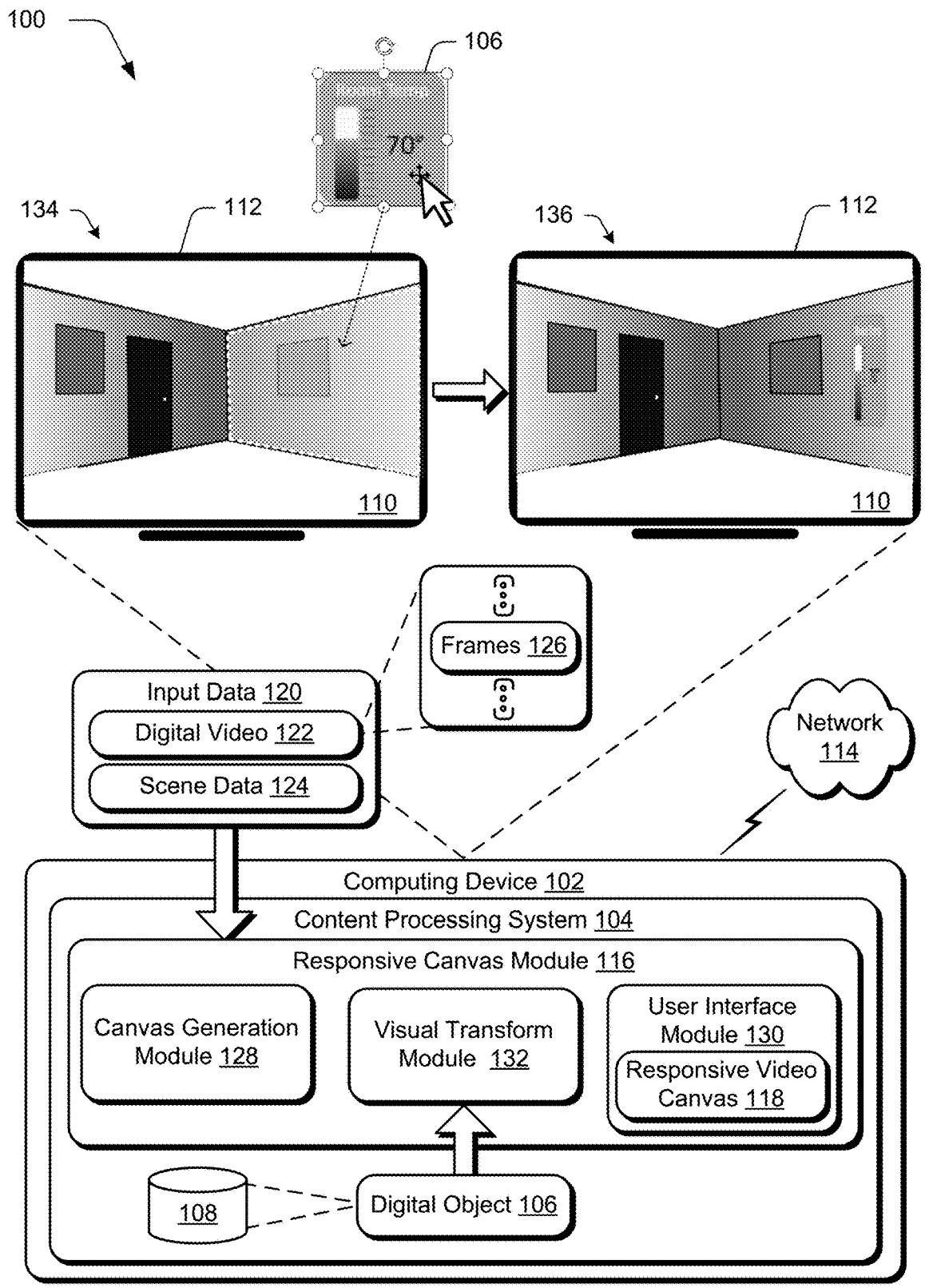
FIG. 1 is an illustration of an environment in an example implementation that is operable to employ responsive video canvas generation techniques described herein.

Content processing systems are often tasked with implementing digital objects in a variety of environments, e.g., virtual and augmented reality environments. However, conventional techniques employed by these systems to support augmented or virtual reality prototyping with three-dimensional visual effects are limited and challenging. For instance, conventional three-dimensional UX tools require an extensive technical knowledge of advanced programming and three-dimensional modelling skills. In an example, this includes a sophisticated understanding of camera tracking, three-dimensional scene layouts, key-frame animation, camera and gizmo control, occlusion, scripting, etc. Accordingly, conventional systems are time-consuming, have a high barrier of entry which inhibits collaboration, and hinder operation of computing devices that implement these conventional approaches.

Conventional two-dimensional user experience (UX) tools, which take a simplistic approach for creation of two-dimensional designs and effects, are easier to learn and are user-friendly. However, conventional implementation of these tools are limited to two-dimensional inputs and therefore lack the ability to process three-dimensional AR or VR interactions. As such, conventional two-dimensional UX tools either do not support a three-dimensional workflow or require manually adjustment on a frame-by-frame basis, which is nonintuitive and time-consuming Accordingly, digital objects included in these systems are static, and lack the ability to interact with an environment in AR or VR applications.

To overcome these limitations, a computing device implements a responsive canvas module to replace a canvas of a two-dimensional design environment with a responsive video canvas operable to impart three-dimensional effects based on underlying scene geometry to one or more two-dimensional digital objects. For example, the responsive canvas module receives input data including a digital video and scene data, e.g., as captured by an AR/VR-camera of an AR/VR-capable mobile device. The digital video includes a number of frames that depict an environment, and the scene data describes a three-dimensional representation of the environment. The three-dimensional representation depicts the underlying geometry of the environment, for instance, through one or more virtual horizontal and vertical planes. In some implementations, the scene data includes matrices operable to render three-dimensional data in clip space coordinates, which are representative of a three-dimensional perspective.

Consider an example in which the digital video and the scene data depict a physical environment such as a room including walls, a ceiling, and a floor. The floor, ceiling, and walls are defined by the three-dimensional representation using planes included in the scene data. A canvas generation module is operable to generate a responsive video canvas based on the input data, for instance to replace the existing canvas of a two-dimensional design environment.

Generation of the responsive video canvas includes generating and associating a respective visual transform with planes of the three-dimensional representation, e.g., with the walls, the ceiling, and the floor. The visual transforms are operable to enable two-dimensional digital objects (e.g., two-dimensional shapes, Lottie animations, vector art, digital videos, design assets, photographs, text object, etc.) to interact with the underlying geometry depicted in the responsive video canvas. In an example, generation of the visual transform involves applying additional transformations to the matrices included in the scene data. The responsive video canvas is rendered for display in a user interface of a display device, for instance by scaling and translating the input data to fit the screen space of the two-dimensional design environment, such that at least one frame of the digital video is displayed.

A visual transform module receives an edit positioning a two-dimensional digital object relative to the responsive video canvas. For instance, the visual transform module computes an intersection of the two-dimensional digital object with a particular plane in the responsive video canvas. Continuing the example above in which the digital video and scene data depict a room, a two-dimensional digital object, in this example a picture of a "welcome doormat," is added by a user to the responsive video canvas via interaction with the user interface. The visual transform module is operable to compute an intersection of the picture with a particular plane, such as the plane defining the floor.

The visual transform module applies the visual transform associated with the particular plane to the digital object to align the digital object. In this example, the visual transform module applies the visual transform associated with the floor to the picture of the doormat to align the picture of the doormat. For instance, by converting vertices of the picture defined in a two-dimensional local coordinate space to clip space coordinates associated with the three-dimensional representation. In this way, the two-dimensional digital object interacts with the underlying scene geometry. For instance, the picture of the doormat "snaps" to the depth and orientation of the floor. Accordingly, the visual appearance of the doormat is modified to look as if it were laying on the floor in the physical environment.

As the frame of the video displayed in the responsive video canvas is updated, visual transforms associated with digital objects included in the scene are also updated. Continuing the example above, the responsive video canvas includes a "scrub bar" that is operable to progress to subsequent frames of the digital video. As a user interacts with the scrub bar, the frame displayed in the responsive video canvas is updated. An updated view matrix is operable to update the visual appearance of two-dimensional digital objects displayed in the room, e.g., the relative location and perspective of the digital objects. In this example, as the digital video pans across the room, the two-dimensional digital object, i.e., the picture of the doormat, appears anchored in place on the floor, for instance in front of a door represented in the video. If the angle of a subsequent frame relative to the preceding frame changes, the visual appearance of the picture is updated to maintain a realistic perspective.

In this way, the techniques described herein provide a modality for intuitive and rapid prototyping of three-dimensional effects by leveraging a two-dimensional design environment. This functionality is not possible using conventional techniques, which either are not compatible with a three-dimensional workflow or require an in-depth knowledge of advanced programming and 3D modelling skills.

In the following discussion, an example environment is described that employs the techniques described herein. Example procedures are also described that are performable in the example environment as well as other environments. Consequently, performance of the example procedures is not limited to the example environment and the example environment is not limited to performance of the example procedures.

Example Environment

FIG. 1 is an illustration of a digital medium environment 100 in an example implementation that is operable to employ responsive video canvas generation techniques described herein. The illustrated environment 100 includes a computing device 102, which is configurable in a variety of ways.

The computing device 102, for instance, is configurable as a desktop computer, a laptop computer, a mobile device (e.g., assuming a handheld configuration such as a tablet or mobile phone), and so forth. Thus, the computing device 102 ranges from full resource devices with substantial memory and processor resources (e.g., personal computers, game consoles) to a low-resource device with limited memory and/or processing resources (e.g., mobile devices). Additionally, although a single computing device 102 is shown, the computing device 102 is also representative of a plurality of different devices, such as multiple servers utilized by a business to perform operations "over the cloud" as described in FIG. 9.

The computing device 102 is illustrated as including a content processing system 104. The content processing system 104 is implemented at least partially in hardware of the computing device 102 to process and transform a digital object 106, which is illustrated as maintained in a storage device 108 of the computing device 102. Such processing includes creation of the digital object 106, modification of the digital object 106, and rendering of the digital object 106 in a user interface 110 for output, e.g., by a display device 112. Although illustrated as implemented locally at the computing device 102, functionality of the content processing system 104 is also configurable as whole or part via functionality available via a network 114, such as part of a web service or "in the cloud."

An example of functionality incorporated by the content processing system 104 to process the digital object 106 is illustrated as a responsive canvas module 116. This module is configured to generate a responsive canvas, e.g., a responsive video canvas 118 to replace a canvas of a two-dimensional design environment, automatically and without user intervention and thus facilitate a three-dimensional workflow in the two-dimensional design environment. In this way, the module supports different modes to support two-dimensional design and three-dimensional design techniques.

In the illustrated example, the responsive canvas module 116 is configured to receive input data 120, which includes a digital video 122 and scene data 124. The digital video 122 contains a plurality of frames 126 that depict an environment, in this example a portion of a room. The scene data 124 describes a three-dimensional representation of the room. In this example, the scene data 124 includes one or more planes that describe the underlying geometry of the environment, e.g., a plane that corresponds to the walls, floor, and ceiling.

A canvas generation module 128 is operable to generate the responsive video canvas 118 from the input data 120. In this example, the canvas generation module 128 does so by scaling and translating the input data 120 so that it fits properly in a screen-space of the two-dimensional design environment, which provides visual consistency and accuracy. Further, generation of the responsive video canvas 118 includes generating and associating visual transforms with the scene data 124, in this example with each plane, e.g., with the walls, the ceiling, and the floor. Generation of the visual transforms involves applying transformations to the scene data 124 to enable a two-dimensional digital object 106 to interact with the underlying scene geometry. Once generated, a user interface module 130 renders the responsive video canvas 118 for interaction, for instance in the user interface 110 by the display device 112.

A visual transform module 132 is operable to receive an edit positioning a digital object 106 relative to the responsive video canvas 118. In the illustrated example, the digital object 106 is a two-dimensional digital asset illustrating room temperature. As shown in first stage 134, the room temperature asset is positioned within the responsive canvas, e.g., via a user interaction with a cursor. The visual transform module 132 computes an intersection of the digital object 106 with a particular plane included in the responsive video canvas 118. In this example, the room temperature asset intersects a plane associated with the wall depicted on the right-hand side of the responsive canvas, illustrated as surrounded by a dashed line.

The visual transform module 132 applies the visual transform associated with the wall to the room temperature asset. In this way, the asset is configured to interact with the underlying scene geometry defined by the scene data 124. For instance, the room temperature asset "snaps" to the depth and orientation of the wall. As shown in second stage 136, the room temperature asset appears as if it is attached to the wall. Accordingly, the techniques described herein overcome the limitations of conventional techniques by generating a responsive video canvas 118 to apply three-dimensional visual effects based on the underlying geometry of an environment to two-dimensional digital objects 106.

In general, functionality, features, and concepts described in relation to the examples above and below are employed in the context of the example procedures described in this section. Further, functionality, features, and concepts described in relation to different figures and examples in this document are interchangeable among one another and are not limited to implementation in the context of a particular figure or procedure. Moreover, blocks associated with different representative procedures and corresponding figures herein are applicable together and/or combinable in different ways. Thus, individual functionality, features, and concepts described in relation to different example environments, devices, components, figures, and procedures herein are usable in any suitable combinations and are not limited to the particular combinations represented by the enumerated examples in this description.

Responsive Video Canvas Generation and Implementation

Figure 2:
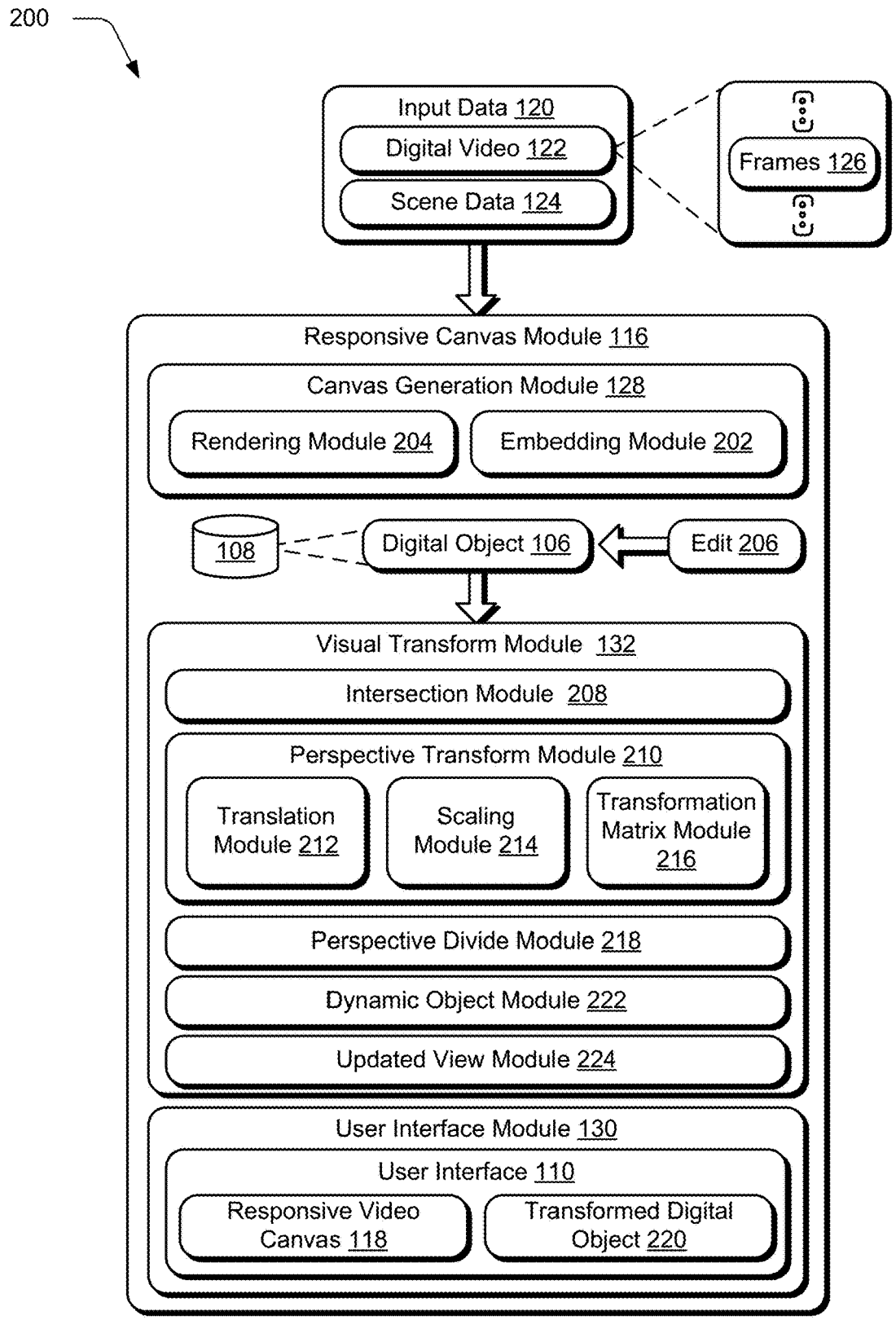
FIG. 2 depicts a system in an example implementation showing operation of the responsive canvas module of FIG. 1 in greater detail.
Figure 3A:
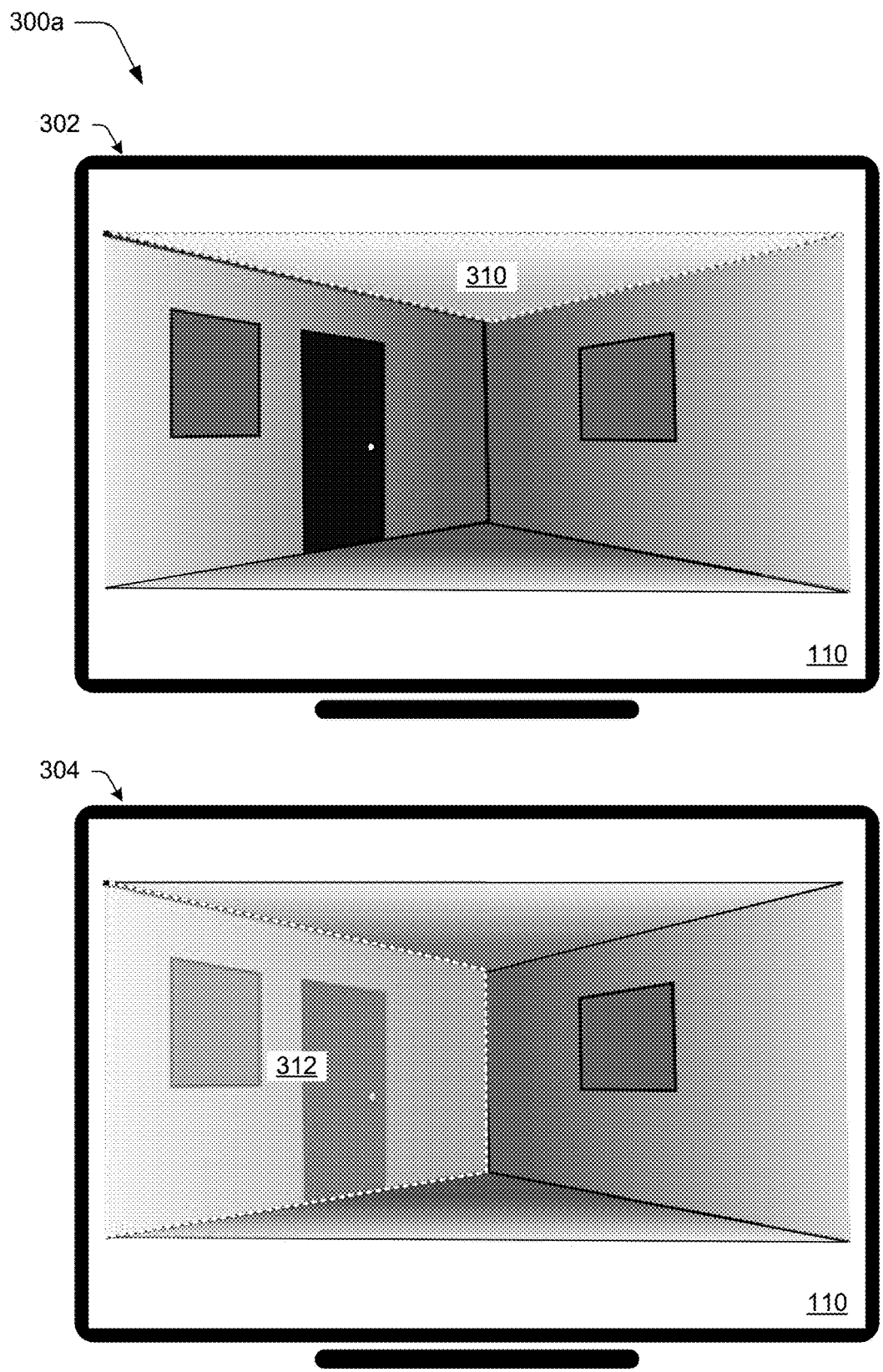
FIGS. 3*a* and 3*b* depict examples of planes of a three-dimensional representation of a room environment in a responsive video canvas.
Figure 3B:
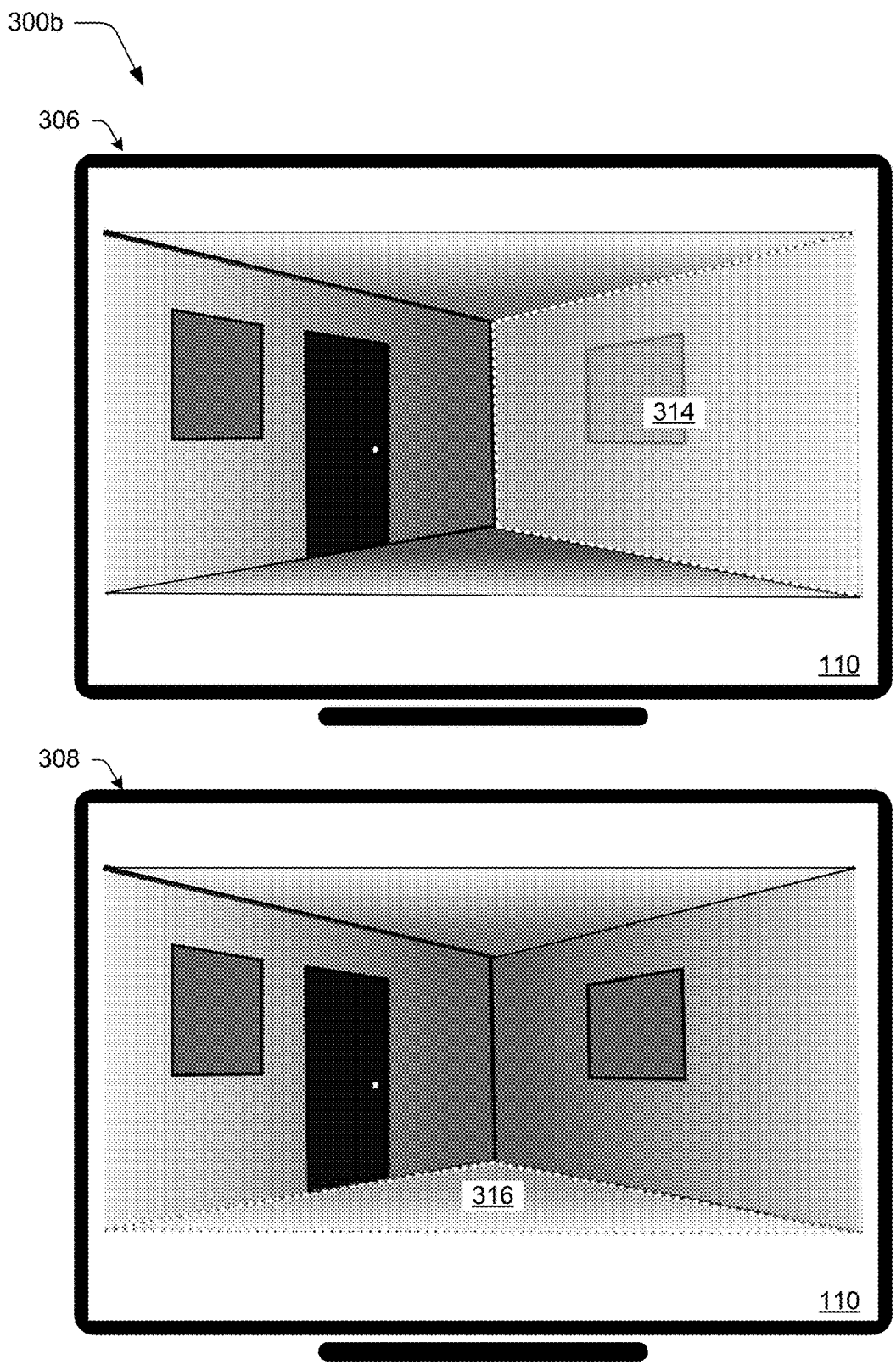
Figure 4A:
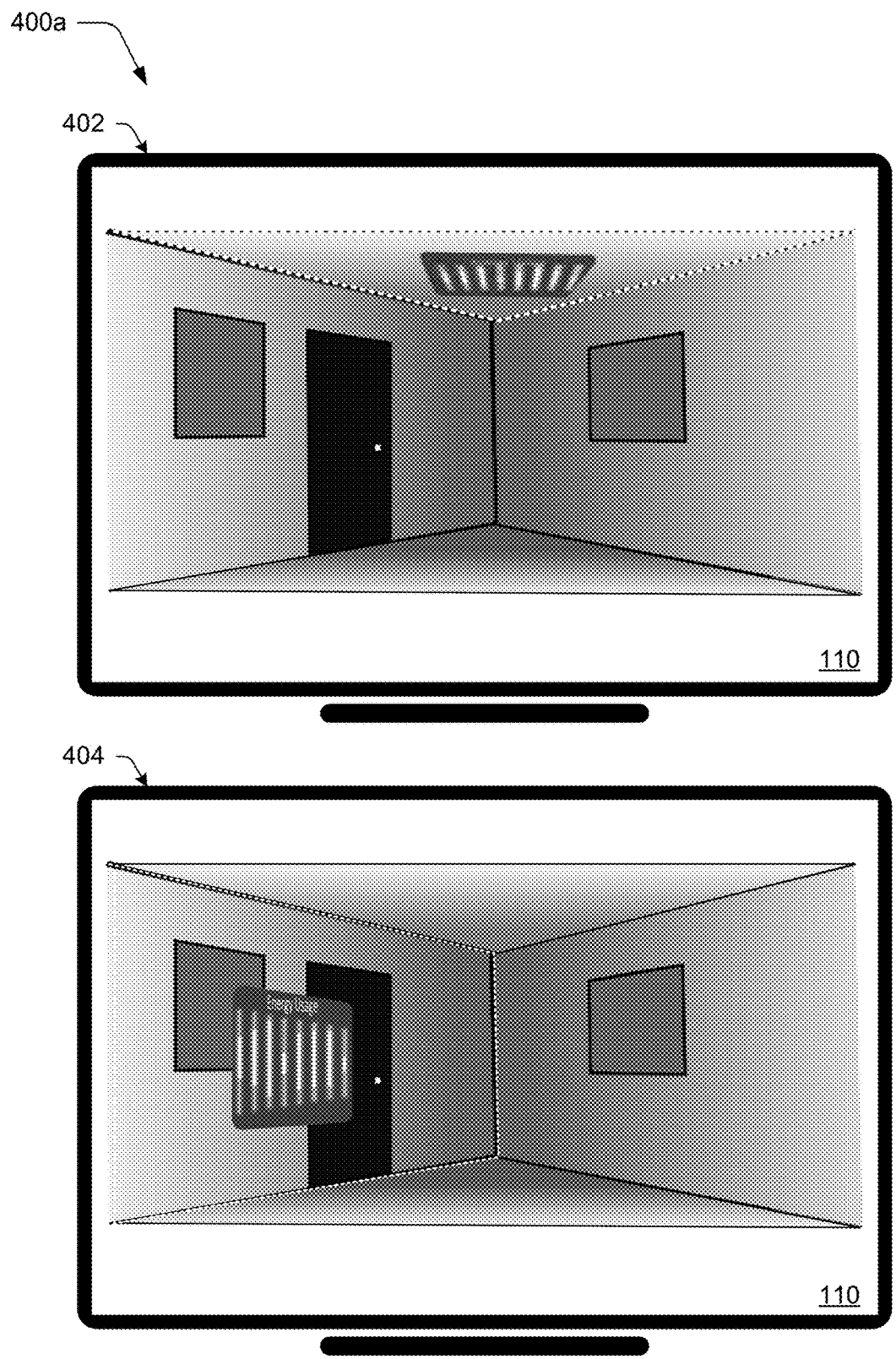
FIGS. 4*a* and 4*b* depict examples of applying respective visual transforms of planes to a digital object in a room environment.
Figure 4B:
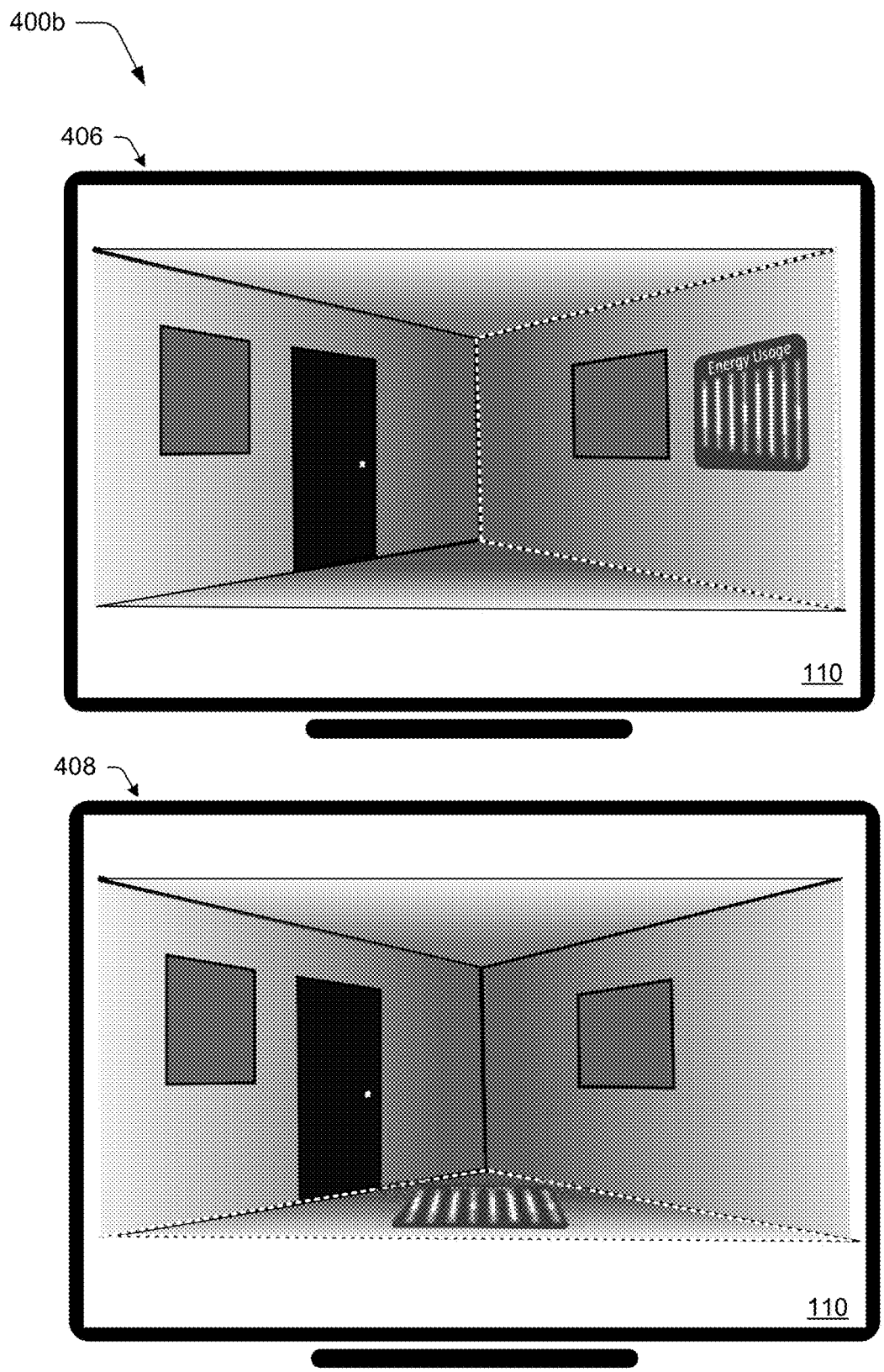
Figure 5B:
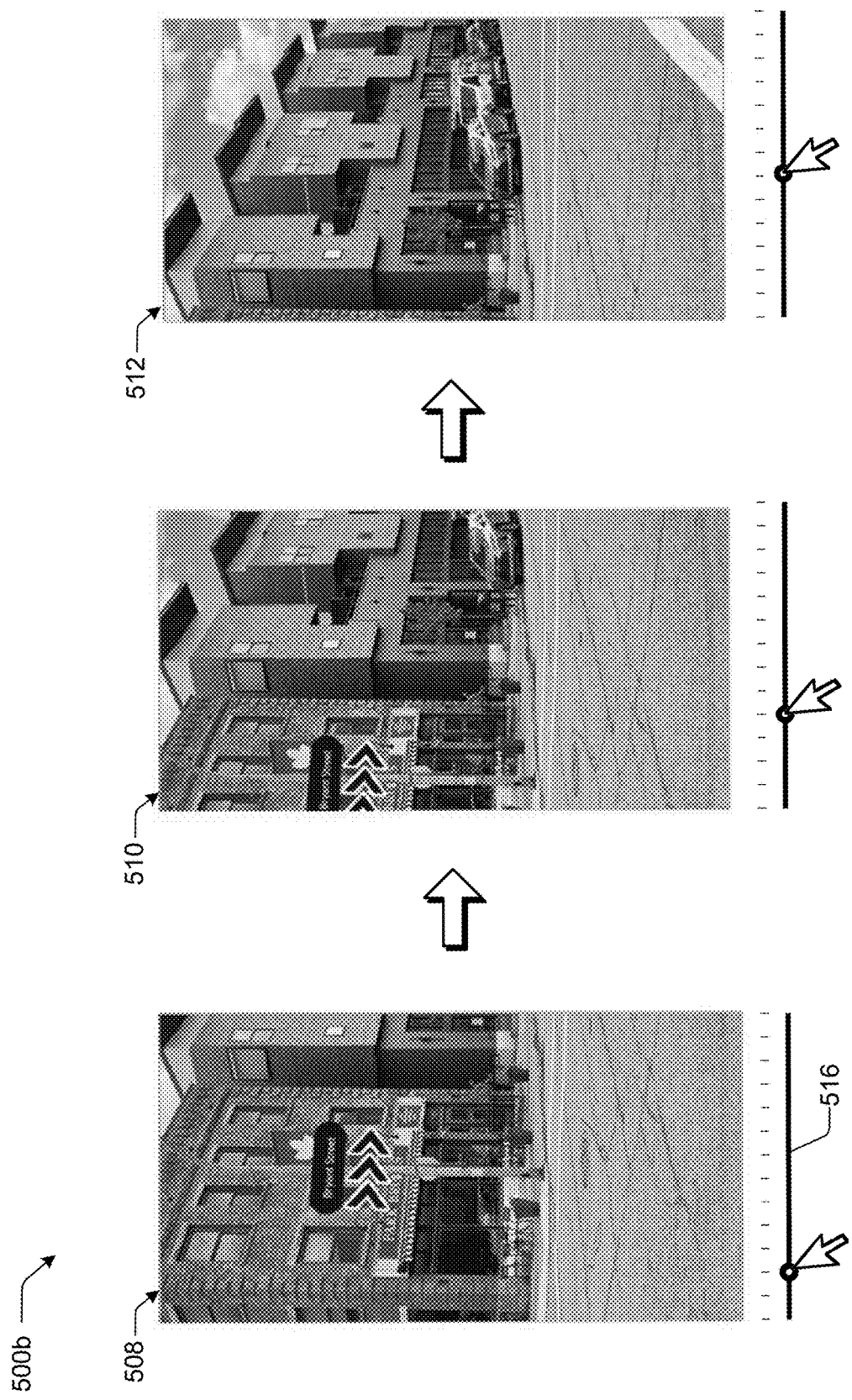
Figure 6B:
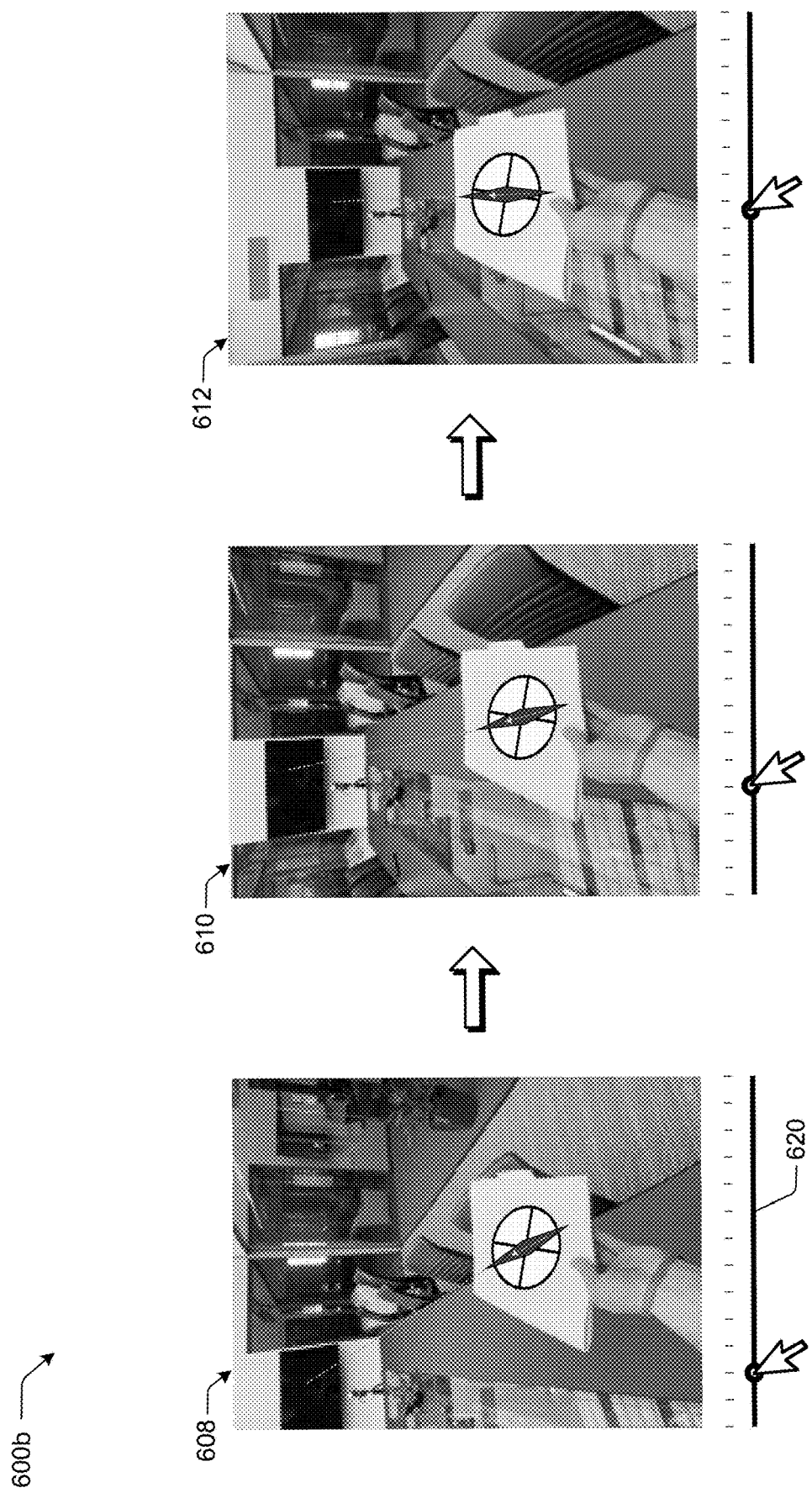
Figure 7:
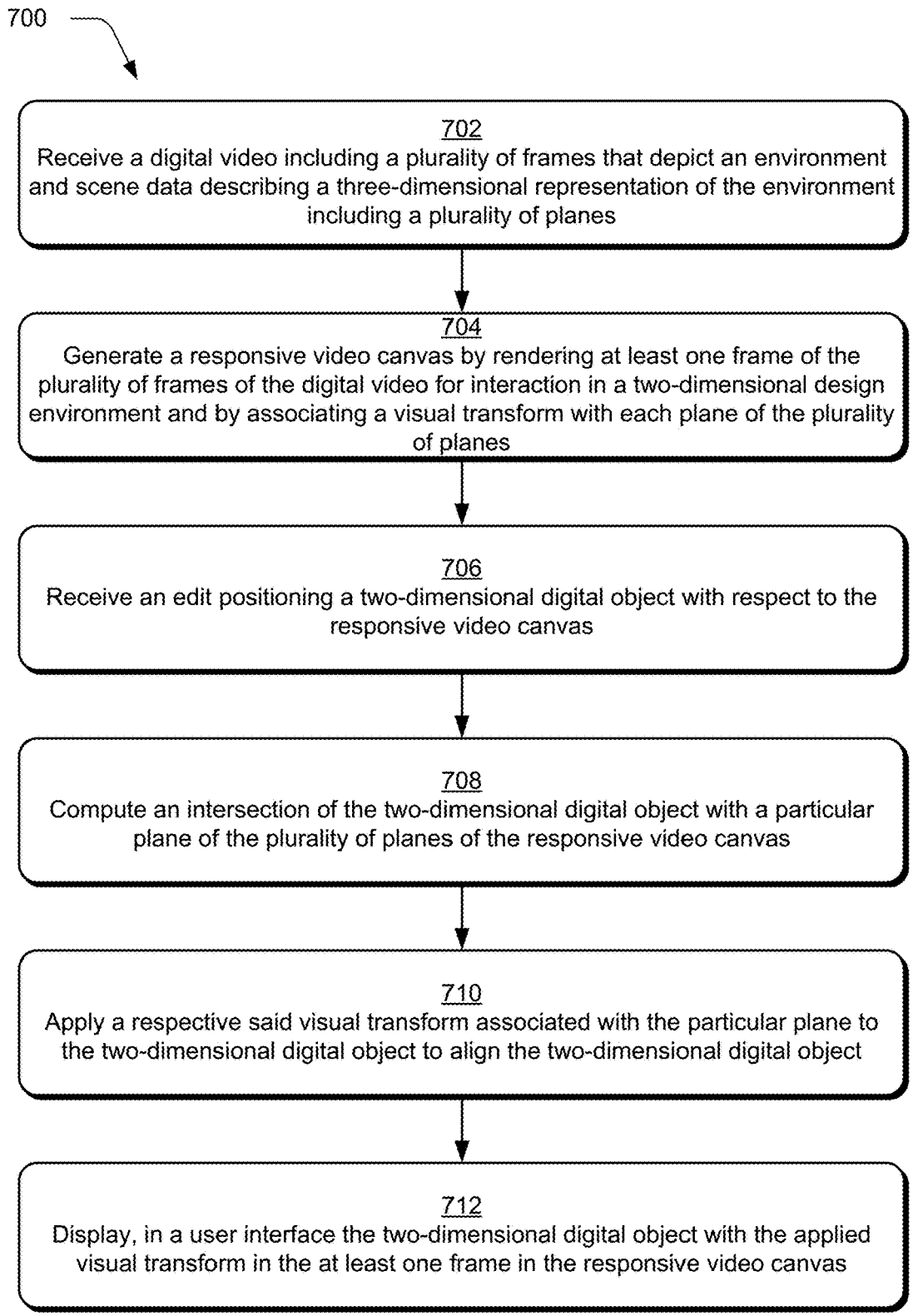
FIG. 7 is a flow diagram depicting a procedure in an example implementation of responsive video canvas generation.

FIG. 2 depicts a system 200 in an example implementation showing operation of the responsive canvas module 116 in greater detail. FIGS. 3*a* and 3*b* depict examples 300*a* and 300*b* of planes of a three-dimensional representation of a room environment in a responsive video canvas. FIGS. 4*a* and 4*b* depict examples 400*a* and 400*b* of applying respective visual transforms of planes to a digital object in a room environment. FIGS. 5*a* and 5*b* depict examples 500*a* and 500*b* of applying a visual transform to a digital object and updating the visual transform as the frame is updated. FIGS. 6*a*, 6*b*, and 6*c* depict examples 600*a*, 600*b*, and 600*c* in which the visual appearance of a digital object is based in part on properties associated with a second digital object. FIG. 7 depicts a procedure 700 in an example implementation of responsive video canvas generation. FIG. 8 depicts a procedure 800 in an example implementation of responsive video canvas generation including applying the visual transform to a digital object in greater detail.

The following discussion describes techniques that are implementable utilizing the previously described systems and devices. Aspects of each of the procedures are implemented in hardware, firmware, software, or a combination thereof. The procedures are shown as a set of blocks that specify operations performed by one or more devices and are not necessarily limited to the orders shown for performing the operations by the respective blocks. In portions of the following discussion, reference will be made to FIGS. 1-8.

To begin in this example, a responsive canvas module 116 is employed to receive input data 120 including digital video 122 and scene data 124 (block 702). The digital video 122 contains a plurality of frames 126 that depict an environment, and the scene data 124 describes a three-dimensional representation of the environment. The three-dimensional representation includes a plurality of planes (e.g., virtual horizontal and vertical planes) that describe the underlying geometry of the scene captured by the digital video 122.

In an example, the input data 120 is a contextual capture obtained from an AR/VR-camera of an AR/VR-capable device. In such examples, the scene data 124 is obtained using one or more sensors of the AR/VR capable device, e.g., orientation sensors, acceleration sensors, depth sensors, position sensors, and so forth. For instance, scene data 124 is generated through use of visual inertial odometry by estimating orientation and translation in response to movements of the AR/VR-camera relative to the environment.

In other examples, the scene data 124 includes one or more of a polygon mesh, a wire-frame model, three-dimensional pose geometry data, a depth map obtained using depth disparity techniques, surface model data, data describing the camera at the time of capture, etc. Further, in some implementations, the scene data 124 includes matrices and/or transforms which are operable to render three-dimensional data in clip space coordinates, which are representative of a three-dimensional perspective. For instance, sets of model, view, and projection matrices as further described below.

Based on the input data 120, a canvas generation module 128 is operable to generate a responsive video canvas 118 by rendering at least one frame of the plurality of frames 126 of the digital video 122 for interaction in a two-dimensional design environment and by associating a visual transform with each plane of the plurality of planes (block 704). For instance, an embedding module 202 is operable to generate and associate visual transforms with the scene data 124. Generation of the visual transforms involves applying transformations to the three-dimensional representations included in the scene data 124 to enable a two-dimensional digital object 106 to interact with the underlying scene geometry. For instance, by applying additional transformations to model, view, and projection matrices included in the scene data 124. In this way, the visual transforms are operable to convert vertices of digital objects 106 defined in a two-dimensional local coordinate space to clip space coordinates associated with the three-dimensional representation as further described below.

A rendering module 204 is employed to scale and translate the input data 120 so that it fits properly in a screen-space of the two-dimensional design environment. For instance, scaling the input data 120 from a real-world unit system associated with the three-dimensional representations (e.g., imperial, metric) to units defined by the two-dimensional design environment. The scaled input data 120 is subsequently translated to conform to a screen-space of the two-dimensional design environment. The responsive video canvas 118 is rendered for interaction by a user interface module 130 to display the responsive video canvas 118 in the user interface 110 by the display device 112. In some examples, this involves replacing the existing canvas of a two-dimensional UX design application with the responsive video canvas 118.

A visual transform module 132 is operable to receive an edit 206 positioning a digital object 106 with respect to the responsive video canvas 118 (block 706). For instance, the user interface module 130 is configured to output the user interface 110, e.g., to receive a user input positioning the digital object 106 illustrated as maintained in a storage device 108. Digital objects 106 include two-dimensional shapes, Lottie animations, vector art, digital videos, design assets, object filters, photographs, text object, etc. In some implementations, the digital object 106 depicts information about the input data 120, for instance describing properties of the input data 120 such as video length, file size, number of planes, camera capture information, etc.

An intersection module 208 computes an intersection of the digital object 106 with respect to the responsive video canvas 118. For instance, as an intersection with a particular plane of the plurality of planes of the responsive video canvas 118 (block 708). In an example, the intersection module 208 performs hit testing to compute the intersection, e.g., from a mouse cursor to the planes included in the responsive video canvas 118. In some implementations in which the digital object 106 intersects with more than one plane, the object is segmented and visual transforms associated with each plane are applied to portions of the digital object 106 in accordance with the techniques described below, e.g., to give the appearance that the digital object 106 is fixed to a corner, partially on one wall and partially on another wall, covering an object defined by multiple planes, moving from one plane to another, etc.

A perspective transform module 210 is operable to apply a visual transform associated with the particular plane to the two-dimensional digital object 106 to align the two-dimensional digital object 106 (block 710). For instance, to align the two-dimensional digital object 106 to a depth and orientation of the particular plane. To do so, consider an example in which the digital object 106 is defined by a two-dimensional plane "P" in a local coordinate space of the two-dimensional design environment. For instance, a local coordinate space centered around the center point of the design canvas, i.e., a center-based coordinate space. In this example, pW and pH represent the plane's width and height, respectively. A vertex of the plane in local coordinate space is defined as a 4D vector in homogeneous coordinates:

$$vt_1 = [x, y, 0, 1]$$

In this example, the scene data 124 includes matrices which are operable to transform three-dimensional data from a coordinate space centered around an origin (0,0) to clip space coordinates. For instance, one or more sets of model, view, and projection matrices. However, these matrices are incompatible with two-dimensional inputs, such as digital objects in the two-dimensional design environment that are defined by a different coordinate space.

Accordingly, a translation module 212 and a scaling module 214 are employed to determine a scaling matrix and a translation matrix. These matrices are used to transform a vertex of the two-dimensional digital object 106 in a local coordinate space of the two-dimensional design environment to a vertex in a different coordinate space associated with the three-dimensional representation (block 802).

For instance, the scaling module 214 determines and applies a scaling matrix:

$$S = \begin{bmatrix} -pW/1000 & 0 & 0 & 0 \\ 0 & -pH/1000 & 0 & 0 \\ 0 & 0 & 1 & 0 \\ 0 & 0 & 0 & 1 \end{bmatrix}$$

And the translation module 212 determines and applies a translation matrix:

$$T = \begin{bmatrix} 1 & 0 & 0 & -pW/2 \\ 0 & 1 & 0 & pH/2 \\ 0 & 0 & 1 & 0 \\ 0 & 0 & 0 & 1 \end{bmatrix}$$

This is performed such that a vertex of the two-dimensional digital object 106 in a center-based coordinate space of the two-dimensional design environment ($vt_1$) is transformed to a vertex in the origin-based coordinate space ($vt_2$) associated with the three-dimensional representation according to the equation:

$$vt_2 = S * T * vt_1$$

Additionally, a transformation matrix module 216 is employed to calculate a transformation matrix to convert a projection matrix associated with the two-dimensional design environment to a projection matrix associated with the three-dimensional representation (block 804). Continuing the example from above, a projection matrix associated with the two-dimensional design environment ($P_1$) is defined as:

$$P_1 = \begin{bmatrix} 1 & 0 & 0 & 0 \\ 0 & 1 & 0 & 0 \\ 0 & 0 & 1 & 0 \\ 0 & 0 & -1/D & 0 \end{bmatrix}$$

Where, in some implementations, D=800 is a default perspective distance. A projection matrix associated with the three-dimensional representation ($P_2$) is defined as:

$$P_2 = \begin{bmatrix} S1 & 0 & A & 0 \\ 0 & S2 & B & 0 \\ 0 & 0 & C & D \\ 0 & 0 & -1 & 0 \end{bmatrix}$$

Accordingly, the transformation matrix module 216 is operable to calculate a transformation matrix:

$$A = \begin{bmatrix} S1 & 0 & C & 0 \\ 0 & S2 & D & 0 \\ 0 & 0 & A & B \\ 0 & 0 & -1 + A/D & B/D \end{bmatrix}$$

Such that: $P_2 = P_1 * A$

Applying the visual transform to the two-dimensional digital object 106 further includes transforming vertices of the two-dimensional digital object 106 in a local coordinate space of the two-dimensional design environment to clip space coordinates in a clip space associated with the three-dimensional representation, for instance, where the clip space defines a three-dimensional perspective (block 806). This is done using the transformation matrix (A), scaling matrix (S), translation matrix (T), the projection matrix associated with the two-dimensional design environment ($P_1$), and the sets of model (M), view (V), and projection ($P_2$) matrices such that:

*ClipSpaceVertex =*

$$P_2 * V * M * vt_2 = P_1 * A * V * M * S * T * vt_1 = (x_c, y_c, z_c, w_c)$$

The visual transform module 132 also includes a perspective divide module 218, which is operable to apply a perspective divide transformation to convert a vertex of the two-dimensional digital object 106 from the clip space coordinates to screen space coordinates (block 808). In this way, the digital object 106 can be rendered for display in the responsive video canvas 118 with the visual transform applied. In an example, VP defines the size of a viewport, e.g., defined by width "$VP_{width}$" and height "$VP_{height}$." The conversion from clip space to screen space associated with the input data 120 is performed using the following equations:

$$x_{screen} = (x_c/z_c + 1) * \frac{1}{2} * VP_{width}$$

$$y_{screen} = \left(1 - (y_c/z_c + 1) * \frac{1}{2}\right) * VP_{height}$$

However, continuing this example, in the two-dimensional design environment, conversion to screen space is defined differently as:

$$x_{screen} = (x_c/z_c)$$

$$y_{screen} = (y_c/z_c)$$

Accordingly, the perspective divide module 218 applies a perspective divide transformation to the clip space vertex to compute the coordinates of the screen space vertex, for instance:

$$ScreenSpaceVertex = \text{Scale}(VP_{width}, VP_{height}) *$$
$$\text{Translate}(0, 1) * \text{Scale}(0.5 - 0.5) * \text{Translate}(1, 1) * \begin{bmatrix} x_c/z_c \\ y_c/z_c \end{bmatrix}$$

Accordingly, once each vertex of the digital object 106, e.g., the two-dimensional plane P, is converted to screen space, a user interface module 130 is employed to display the two-dimensional digital object 106 with the applied visual transform in the at least one frame in the responsive video canvas 118 (block 712). For instance, as a transformed digital object 220 in the user interface 110.

An implementation in which the three-dimensional representation includes a plurality of planes (e.g., virtual horizontal and vertical planes) that describe the scene captured by the digital video 122 is shown in examples 300*a* and 300*b* of FIGS. 3*a* and 3*b*, illustrated in first, second, third and fourth stages 302, 304, 306, and 308. For instance, as shown at first stage 302, a frame of the plurality of frames 126 of a digital video 122 is rendered for display in a responsive video canvas 118, the frame depicting a room including two walls, a floor, and a ceiling. A plane associated with the ceiling 310 is identified as surrounded by a dashed line. Similarly, at second stage 304, a plane associated with the left wall 312 is shown, represented by a dashed white line. Third stage 306 identifies a plane associated with the right wall 314, and fourth stage 308 identifies a plane associated with the floor 316. A visual transform is associated with each plane in accordance with the techniques described above, such that digital objects 106 that are added to the responsive video canvas 118 can interact with the underlying scene geometry, in this example the planes that define the walls, floor, and ceiling.

For instance, as shown in examples 400*a* and 400*b* of FIGS. 4*a* and 4*b*, illustrated in first, second, third and fourth stages 402, 404, 406, and 408, a two-dimensional digital object 106 has been added to different planes included in the responsive video canvas 118. In this example, the digital object 106 is a Lottie animation depicting energy usage. At first stage 402, a visual transform associated with the ceiling is applied to the animation. Accordingly, the energy usage animation is shown aligned with the ceiling. At second stage 404, a visual transform associated with the left wall is applied to the animation, which aligns the animation with the left wall. At third stage 406, the energy usage animation is shown aligned with the right-hand wall after a visual transform associated with the right wall is applied. At fourth stage 408, a visual transform associated with the floor is applied to the animation. As illustrated, the respective energy usage animation is shown aligned with the floor. Accordingly, different visual effects are applied to the Lottie animation automatically and without user intervention based on the application of different visual transforms.

In some implementations, the responsive canvas module 116 includes an updated view module 224, which is employed to update the visual appearance of digital objects 106 represented in the responsive canvas as the displayed frame is updated. For instance, the updated view module 224 is operable to select a second frame of the digital video 122 and update the visual transform applied to the two-dimensional digital object 106 based on scene data 124 associated with the second frame. For instance, by calculating an updated view matrix to update the visual appearance of one or more digital objects 106 included in the responsive video canvas 118.

In an example, a digital object 106 is "anchored" in place, such that as the frame is updated the digital object 106 appears to remain in the same location in the environment depicted by the digital video 122. For instance, in examples 500a and 500b of FIGS. 5a and 5b, illustrated in first, second, third, fourth, fifth and sixth stages 502, 504, 506, 508, 510, and 512, a two-dimensional digital object 106 is added to the responsive video canvas 118. In this example, the digital object 106 is a graphic depicting a series of arrows indicating a direction to "Bryant Street." At first stage 502 a user drags the digital object 106 onto the responsive video canvas 118. As shown at second stage 504, the graphic intersects with a plane associated with a wall of a building 514, delineated by a shaded area surrounded by a dashed line. A visual transform associated with the wall is applied to the graphic, which is effective to align the graphic to the depth and orientation of the building, as shown at third stage 506.

As shown in fourth stage 508, in this example a user interacts with a "scrub bar" 516 to progress to a second frame of the digital video 122. In progressing from fourth stage 508 to fifth stage 510, as the frame of the video shown in the responsive video canvas 118 is updated, so is the relative position of the graphic. In this example, the graphic remains "anchored" to the depth and orientation of the building. As shown in progressing from fifth stage 510 to sixth stage 512, as the user further interacts with the scrub bar to progress to a third frame, the graphic remains anchored in the same relative location, and is no longer visible in the responsive video canvas 118. In this way, the techniques described herein replicate a three-dimensional augmented or virtual reality experience in a two-dimensional design environment where the object location is updated automatically and without user intervention.

In another instance, the digital object 106 is configured to "follow" a feature included in the digital video 122. Consider an example in which the digital video 122 depicts a car driving down the street. Using the techniques described above, a responsive video canvas 118 is generated, and a digital object 106 is added to the scene, in this case the digital object 106 is a graphic to be applied to the side of the car. A visual transform associated with the car is applied to the graphic, such that the graphic aligns to the depth and orientation of a plane associated with the car. As the frame is updated, the relative location of the car in the environment changes, and the visual transform applied to the graphic is also updated. Accordingly, this produces a visual effect where the digital object 106 responds automatically to the features in the digital video 122 defined by scene data 124.

The digital object 106 can also be configured to interact with one or more other digital objects in the responsive video canvas 118. In some implementations, the responsive canvas module 116 includes a dynamic object module 222, which is operable to alter the visual appearance of a digital object 106 represented in the responsive video canvas 118 based on properties associated with one or more other digital objects. In some implementations, this includes altering the visual transform applied to the digital object 106 based on properties associated with a second digital object.

An example of this functionality is shown in 600a, 600b, and 600c of FIGS. 6a, 6b, and 6c, illustrated in first, second, third, fourth, fifth, sixth, seventh, eighth, and ninth stages 602, 604, 606, 608, 610, 612, 614, 616, and 618. At first stage 602, a responsive video canvas 118 is shown including a first frame of a digital video 122 depicting an environment of a conference room, the responsive video canvas 118 rendered in accordance with the techniques described above. At second stage 604, a user includes two different digital objects in the scene. The first digital object is a compass graphic, and the second digital object is a "destination asset," illustrated in second stage 604 as a four-pointed star. The destination asset is configured to remain hidden when represented in the responsive video canvas 118 and the compass graphic is configured to point to the destination asset.

In second stage 604, the compass graphic intersects with a plane associated with a manila folder, and the destination asset intersects with a plane associated with a monitor included in the frame. As shown in third stage 606, a visual transform associated with the folder is applied to the compass graphic, which is effective to align the graphic to the depth and orientation of the folder. The destination asset is aligned to the depth, location, and orientation of the monitor however is configured to not be displayed in the responsive video canvas 118. As further shown in third stage 606, the needle of the compass graphic points to the destination asset, e.g., the monitor.

In fourth stage 608, a user interacts with a scrub bar 620 to progress to a second frame of the digital video 122. In this example the video pans to the left, and the position of the compass relative to the destination asset changes accordingly. As shown in fifth stage 610, in the second frame the compass is configured to point to the destination asset while remaining aligned to the depth and orientation of the manilla folder. Similarly, progressing from the second frame shown in fifth stage 610 to a third frame in sixth stage 612, the compass remains aligned with the folder and the needle of the compass continues to point to the destination asset. A similar functionality is illustrated in progressing to a fourth frame shown in seventh stage 614, a fifth frame in eighth stage 616, and a sixth frame shown in ninth stage 618.

In this way, the visual appearance of the digital object 106 included in the responsive video canvas 118 is based on the underlying geometry of the environment, as well as on properties and/or a defined relationship to a second digital object included in the responsive video canvas 118. Accordingly, the techniques described herein leverage functionality from otherwise incompatible modalities to enable intuitive and rapid prototyping of three-dimensional effects by leveraging a two-dimensional design environment. This overcomes the limitations of conventional techniques, which either are not compatible with a three-dimensional workflow or require an in-depth knowledge of advanced programming and 3D modelling skills.

Example System and Device

Figure 9:
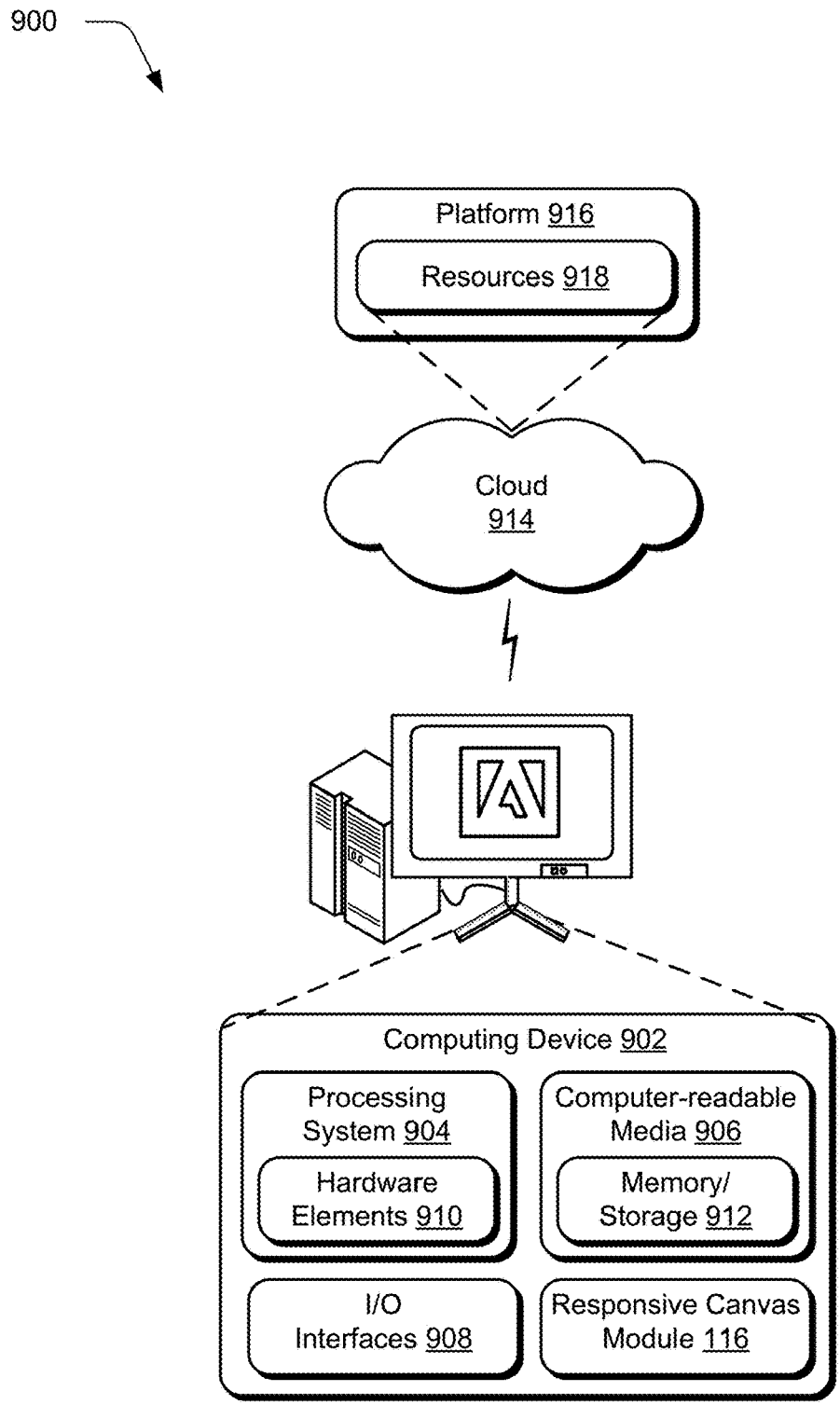
FIG. 9 illustrates an example system including various components of an example device that can be implemented as any type of computing device as described and/or utilize with reference to FIGS. 1-8 to implement embodiments of the techniques described herein.

FIG. 9 illustrates an example system generally at 900 that includes an example computing device 902 that is representative of one or more computing systems and/or devices that implement the various techniques described herein. This is illustrated through inclusion of the responsive canvas module 116. The computing device 902 is configurable, for example, as a server of a service provider, a device associated with a client (e.g., a client device), an on-chip system, and/or any other suitable computing device or computing system.

The example computing device 902 as illustrated includes a processing system 904, one or more computer-readable media 906, and one or more I/O interface 908 that are communicatively coupled, one to another. Although not shown, the computing device 902 further includes a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 904 is representative of functionality to perform one or more operations using hardware. Accordingly, the processing system 904 is illustrated as including hardware element 910 that is configurable as processors, functional blocks, and so forth. This includes implementation in hardware as an application specific integrated circuit or other logic device formed using one or more semiconductors. The hardware elements 910 are not limited by the materials from which they are formed or the processing mechanisms employed therein. For example, processors are configurable as semiconductor(s) and/or transistors (e.g., electronic integrated circuits (ICs)). In such a context, processor-executable instructions are electronically-executable instructions.

The computer-readable storage media 906 is illustrated as including memory/storage 912. The memory/storage 912 represents memory/storage capacity associated with one or more computer-readable media. The memory/storage 912 includes volatile media (such as random-access memory (RAM)) and/or nonvolatile media (such as read only memory (ROM), Flash memory, optical disks, magnetic disks, and so forth). The memory/storage 912 includes fixed media (e.g., RAM, ROM, a fixed hard drive, and so on) as well as removable media (e.g., Flash memory, a removable hard drive, an optical disc, and so forth). The computer-readable media 906 is configurable in a variety of other ways as further described below.

Input/output interface(s) 908 are representative of functionality to allow a user to enter commands and information to computing device 902, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., employing visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 902 is configurable in a variety of ways as further described below to support user interaction.

Various techniques are described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques are configurable on a variety of commercial computing platforms having a variety of processors.

An implementation of the described modules and techniques is stored on or transmitted across some form of computer-readable media. The computer-readable media includes a variety of media that is accessed by the computing device 902. By way of example, and not limitation, computer-readable media includes "computer-readable storage media" and "computer-readable signal media."

"Computer-readable storage media" refers to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media include but are not limited to RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and are accessible by a computer.

"Computer-readable signal media" refers to a signal-bearing medium that is configured to transmit instructions to the hardware of the computing device 902, such as via a network. Signal media typically embodies computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 910 and computer-readable media 906 are representative of modules, programmable device logic and/or fixed device logic implemented in a hardware form that are employed in some embodiments to implement at least some aspects of the techniques described herein, such as to perform one or more instructions. Hardware includes components of an integrated circuit or on-chip system, an application-specific integrated circuit (ASIC), a field-programmable gate array (FPGA), a complex programmable logic device (CPLD), and other implementations in silicon or other hardware. In this context, hardware operates as a processing device that performs program tasks defined by instructions and/or logic embodied by the hardware as well as a hardware utilized to store instructions for execution, e.g., the computer-readable storage media described previously.

Combinations of the foregoing are also be employed to implement various techniques described herein. Accordingly, software, hardware, or executable modules are implemented as one or more instructions and/or logic embodied on some form of computer-readable storage media and/or by one or more hardware elements 910. The computing device 902 is configured to implement particular instructions and/or functions corresponding to the software and/or hardware modules. Accordingly, implementation of a module that is executable by the computing device 902 as software is achieved at least partially in hardware, e.g., through use of computer-readable storage media and/or hardware elements 910 of the processing system 904. The instructions and/or functions are executable/operable by one or more articles of manufacture (for example, one or more computing devices 902 and/or processing systems 904) to implement techniques, modules, and examples described herein.

The techniques described herein are supported by various configurations of the computing device 902 and are not limited to the specific examples of the techniques described herein. This functionality is also implementable all or in part through use of a distributed system, such as over a "cloud" 914 via a platform 916 as described below.

The cloud 914 includes and/or is representative of a platform 916 for resources 918. The platform 916 abstracts underlying functionality of hardware (e.g., servers) and software resources of the cloud 914. The resources 918 include applications and/or data that can be utilized while computer processing is executed on servers that are remote from the computing device 902. Resources 918 can also include services provided over the Internet and/or through a subscriber network, such as a cellular or Wi-Fi network.

The platform 916 abstracts resources and functions to connect the computing device 902 with other computing devices. The platform 916 also serves to abstract scaling of resources to provide a corresponding level of scale to encountered demand for the resources 918 that are implemented via the platform 916. Accordingly, in an interconnected device embodiment, implementation of functionality described herein is distributable throughout the system 900. For example, the functionality is implementable in part on the computing device 902 as well as via the platform 916 that abstracts the functionality of the cloud 914.

Conclusion

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method comprising:
receiving, by a processing device, a digital video including a plurality of frames that depict an environment and scene data describing a three-dimensional representation of the environment including a plurality of planes;
generating, in a user interface of the processing device, a responsive video canvas by rendering at least one frame of the plurality of frames of the digital video for interaction in a two-dimensional design environment and by associating a visual transform with each plane of the plurality of planes;
receiving, by the processing device, an edit positioning a two-dimensional digital object with respect to the responsive video canvas;
computing, by the processing device, an intersection of the two-dimensional digital object with a particular plane of the plurality of planes of the responsive video canvas;
applying, by the processing device, a respective said visual transform associated with the particular plane to the two-dimensional digital object to align the two-dimensional digital object, the respective said visual transform based in part on an additional two-dimensional digital object; and
displaying, in the user interface of the processing device, the two-dimensional digital object with the applied visual transform in the at least one frame in the responsive video canvas.

2. The method as described in claim 1, wherein the generating the responsive video canvas includes scaling and translating the digital video and the scene data to fit in a screen space of the two-dimensional design environment.

3. The method as described in claim 1, wherein the applying the visual transform to the two-dimensional digital object includes determining a scaling matrix and a translation matrix to transform a vertex of the two-dimensional digital object in a local coordinate space of the two-dimensional design environment to a vertex in a different coordinate space associated with the three-dimensional representation.

4. The method as described in claim 1, wherein the applying the visual transform to the two-dimensional digital object includes calculating a transformation matrix to convert a projection matrix associated with the two-dimensional design environment to a projection matrix associated with the three-dimensional representation.

5. The method as described in claim 1, wherein the applying the visual transform to the two-dimensional digital object includes transforming vertices of the two-dimensional digital object in a local coordinate space of the two-dimensional design environment to clip space coordinates in a clip space associated with the three-dimensional representation, the clip space defining a three-dimensional perspective.

6. The method as described in claim 5, wherein the displaying the two-dimensional digital object with the applied visual transform includes applying a perspective divide transformation to convert a vertex of the two-dimensional digital object from the clip space coordinates to screen space coordinates.

7. The method as described in claim 1, wherein the visual transform is operable to align the two-dimensional digital object to a depth and an orientation of the particular plane.

8. The method as described in claim 1, further comprising selecting a second frame of the digital video and updating the visual transform applied to the two-dimensional digital object based on scene data associated with the second frame.

9. A system comprising:
a memory component; and
a processing device coupled to the memory component, the processing device to perform operations including:
receiving a digital video including a plurality of frames that depict an environment and scene data describing a three-dimensional representation of the environment including a plurality of planes;
generating, in a user interface, a responsive video canvas by rendering a first frame of the plurality of frames of the digital video for interaction in a two-dimensional design environment and by associating a visual transform with each plane of the plurality of planes, the visual transforms operable to convert two-dimensional digital objects defined in a two-dimensional local coordinate space to clip space coordinates associated with the three-dimensional representation and the plurality of planes;

receiving an edit positioning a two-dimensional digital object with respect to a particular plane of the plurality of planes in the responsive video canvas;

applying a respective said visual transform associated with the particular plane to the two-dimensional digital object to align the two-dimensional digital object; and displaying, in a user interface, the two-dimensional digital object with the applied visual transform in the first frame in the responsive video canvas.

10. The system as described in claim 9, wherein the generating the responsive video canvas includes scaling and translating the digital video and the scene data to fit in a screen space of the two-dimensional design environment.

11. The system as described in claim 9, wherein the applying the visual transform to the two-dimensional digital object includes determining a scaling matrix and a translation matrix to transform a vertex of the two-dimensional digital object in a center-based coordinate space of the two-dimensional design environment to a vertex in an origin-based coordinate space associated with the three-dimensional representation.

12. The system as described in claim 9, wherein the applying the visual transform to the two-dimensional digital object includes calculating a transformation matrix to convert a projection matrix associated with the two-dimensional design environment to a projection matrix associated with the three-dimensional representation.

13. The system as described in claim 9, wherein the applying the visual transform to the two-dimensional digital object includes transforming vertices of the two-dimensional digital object in a center-based coordinate space of the two-dimensional design environment to clip space coordinates in a clip space associated with the three-dimensional representation, the clip space defining a three-dimensional perspective.

14. The system as described in claim 13, wherein the displaying the two-dimensional digital object with the applied visual transform includes applying a perspective divide transformation to convert a vertex of the two-dimensional digital object from the clip space coordinates to screen space coordinates.

15. The system as described in claim 9, wherein the visual transform is operable to align the two-dimensional digital object to a depth and an orientation of the particular plane.

16. The system as described in claim 9, wherein the visual transform is based at least in part on properties associated with a second two-dimensional digital object.

17. The system as described in claim 9, further comprising selecting a second frame of the digital video and updating the visual transform applied to the two-dimensional digital object based on scene data associated with the second frame.

18. A system comprising:

means for receiving a digital video including a plurality of frames that depict an environment and scene data describing a three-dimensional representation of the environment including matrices operable to render three-dimensional data in clip space coordinates, the clip space coordinates representative of a three-dimensional perspective;

means for generating one or more visual transforms based on the scene data, the one or more visual transforms operable to convert two-dimensional digital objects defined in a two-dimensional local coordinate space to clip space coordinates associated with the three-dimensional representation;

means for generating, in a user interface, a responsive video canvas including a plurality of planes by rendering at least one frame of the plurality of frames of the digital video for interaction in a two-dimensional design environment and by associating a visual transform of the one or more visual transforms with each plane of the plurality of planes;

means for receiving an edit positioning a two-dimensional digital object with respect to a particular plane of the plurality of planes in the responsive video canvas;

means for applying a respective said visual transform associated with the particular plane to the two-dimensional digital object to transform vertices of the two-dimensional digital object from two-dimensional local coordinate space to clip space coordinates associated with a three-dimensional perspective of the particular plane; and means for displaying the two-dimensional digital object with the applied visual transform in a first frame of the digital video in the responsive video canvas by converting the vertices of the two-dimensional digital object from clip space coordinates to screen space coordinates.

19. The system as described in claim 18, wherein the generating means includes means for applying transformations to the matrices included in the scene data, the matrices including one or more sets of model, view, and projection matrices.

20. The system as described in claim 18, wherein the respective said visual transform is based at least in part on properties associated with a second two-dimensional digital object.

* * * * *